US009829931B2

(12) United States Patent
Sugihara et al.

(10) Patent No.: US 9,829,931 B2
(45) Date of Patent: Nov. 28, 2017

(54) HEAD-MOUNTED DISPLAY, IMAGE DISPLAY SYSTEM, INFORMATION STORAGE DEVICE, AND METHOD FOR CONTROLLING HEAD-MOUNTED DISPLAY

(71) Applicant: OLYMPUS CORPORATION, Tokyo (JP)

(72) Inventors: Ryohei Sugihara, Machida (JP); Seiji Tatsuta, Hachioji (JP); Teruo Tomita, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/244,435

(22) Filed: Aug. 23, 2016

(65) Prior Publication Data

US 2016/0357227 A1   Dec. 8, 2016

Related U.S. Application Data

(60) Division of application No. 14/560,365, filed on Dec. 4, 2014, now Pat. No. 9,665,133, which is a
(Continued)

(30) Foreign Application Priority Data

Jun. 7, 2012   (JP) .................................. 2012-129789

(51) Int. Cl.
*G09G 5/00*      (2006.01)
*G06F 1/16*      (2006.01)
(Continued)

(52) U.S. Cl.
CPC ......... *G06F 1/1694* (2013.01); *G02B 27/017* (2013.01); *G02B 27/0172* (2013.01);
(Continued)

(58) Field of Classification Search
CPC  G09G 5/00; G09G 2320/0261; G06F 1/1694; G06F 3/002; G06F 3/147;
(Continued)

(56) References Cited

U.S. PATENT DOCUMENTS

2002/0196389 A1   12/2002  Koyama
2005/0248852 A1   11/2005  Yamasaki
2012/0274554 A1*  11/2012  Kinoshita ............. A61B 5/1118
                                                        345/156

FOREIGN PATENT DOCUMENTS

JP    07-140416 A    6/1995
JP    07-143522 A    6/1995
(Continued)

OTHER PUBLICATIONS

Office Action dated Nov. 28, 2016 received in U.S. Appl. No. 14/560,365.
(Continued)

*Primary Examiner* — Ariel Balaoing
(74) *Attorney, Agent, or Firm* — Scully, Scott, Murphy & Presser, P.C.

(57) ABSTRACT

A head-mounted display is worn on the head of the user, and allows the user to observe a display image, the head-mounted display including a display section that displays the display image, and a control section that performs a control process that controls the timing at which the display image is displayed on the display section. The control section performs the control process that causes a display period and a non-display period to repeat alternately, and sets one display period to be equal to or less than 600 ms, the display period being a period in which the display image is displayed on the display section, and the non-display period being a period in which the display image is not displayed on the display section.

16 Claims, 10 Drawing Sheets

Related U.S. Application Data continuation of application No. PCT/JP2013/064845, filed on May 29, 2013.

(51) Int. Cl.
*G02B 27/01* (2006.01)
*G06F 3/00* (2006.01)
*G06F 3/147* (2006.01)

(52) U.S. Cl.
CPC ......... *G02B 27/0179* (2013.01); *G06F 3/002* (2013.01); *G09G 5/00* (2013.01); *G02B 2027/014* (2013.01); *G02B 2027/0187* (2013.01); *G06F 3/147* (2013.01); *G06F 2200/1637* (2013.01); *G09G 2310/08* (2013.01); *G09G 2320/0261* (2013.01); *G09G 2354/00* (2013.01)

(58) Field of Classification Search
CPC ..... G06F 2320/0261; G06F 2200/1637; G02B 27/017; G02B 2027/014; G02B 2027/0187

See application file for complete search history.

(56) References Cited

FOREIGN PATENT DOCUMENTS

| | | | |
|---|---|---|---|
| JP | 2007-221647 A | 8/2007 | |
| JP | 2011-067277 A | 4/2011 | |
| JP | 2011-091789 A | 5/2011 | |
| WO | WO2011108372 A1 * | 9/2011 | ............... A61B 5/11 |

OTHER PUBLICATIONS

International Search Report dated Aug. 27, 2013 received in PCT/JP2013/064845.

* cited by examiner

HEAD-MOUNTED DISPLAY, IMAGE DISPLAY SYSTEM, INFORMATION STORAGE DEVICE, AND METHOD FOR CONTROLLING HEAD-MOUNTED DISPLAY

CROSS REFERENCE TO RELATED APPLICATION

This application is a divisional application of U.S. patent application Ser. No. 14/560,365, filed Dec. 4, 2014, which is a continuation of International Patent Application No. PCT/JP2013/064845, having an international filing date of May 29, 2013, which designated the United States, the entire contents each of which are incorporated herein by reference. Japanese Patent Application No. 2012-129789 filed on Jun. 7, 2012 is also incorporated herein by reference in its entirety.

BACKGROUND

The present invention relates to a head-mounted display (HMD), an image display system, an information storage device, a method for controlling a head-mounted display, and the like.

A device has been proposed that senses the state of an athlete, a person who performs health-care exercise, or the like, and feeds back the resulting information to the user. According to such a device, the user can perform appropriate exercise based on the information fed back to the user, and the effect of exercise can be improved, for example.

In recent years, the size of a head-mounted display has been reduced, and a head-mounted display that can be used in a mobile environment (e.g., outdoors) has been developed. In view of the above situation, use of a head-mounted display to feedback information (e.g., exercise condition information) to the user during exercise has been studied.

For example, JP-A-2011-067277 discloses a technique that displays the running distance and the running pace on a head-mounted display while the user is running.

SUMMARY

According to one aspect of the invention, there is provided a head-mounted display that is worn on a head of a user, and allows the user to observe a display image, the head-mounted display comprising:

a display section that displays the display image; and a control section that performs a control process that controls a timing at which the display image is displayed on the display section, the control section performing the control process that causes a display period and a non-display period to repeat alternately, and sets one display period to be equal to or less than 600 ms, the display period being a period in which the display image is displayed on the display section, and the non-display period being a period in which the display image is not displayed on the display section.

According to another aspect of the invention, there is provided a head-mounted display that is worn on a head of a user, and allows the user to observe a display image, the head-mounted display comprising:

a display section that displays the display image;

a control section that performs a control process that controls a timing at which the display image is displayed on the display section; and a sensor signal acquisition section that acquires a motion sensor signal from a motion sensor that detects a motion of the user, the control section performing the control process that causes a display period and a non-display period to repeat alternately, and determines a display start timing of the display image based on the motion sensor signal acquired from the sensor signal acquisition section, the display period being a period in which the display image is displayed on the display section, and the non-display period being a period in which the display image is not displayed on the display section.

According to another aspect of the invention, there is provided an image display system comprising:

the head-mounted display; and an information terminal device that communicates with the head-mounted display.

According to another aspect of the invention, there is provided a computer-readable storage device with an executable program stored thereon, wherein the program instructs a head-mounted display that is worn on a head of a user, and allows the user to observe a display image, to perform steps of:

displaying the display image;

performing a control process that controls a timing at which the display image is displayed on a display section of the head-mounted display; and performing the control process that causes a display period and a non-display period to repeat alternately, and sets one display period to be equal to or less than 600 ms, the display period being a period in which the display image is displayed on the display section, and the non-display period being a period in which the display image is not displayed on the display section.

According to another aspect of the invention, there is provided a computer-readable storage device with an executable program stored thereon, wherein the program instructs a head-mounted display that is worn on a head of a user, and allows the user to observe a display image, to perform steps of:

displaying the display image;

performing a control process that controls a timing at which the display image is displayed on a display section of the head-mounted display;

acquiring a motion sensor signal from a motion sensor that detects a motion of the user; and performing the control process that causes a display period and a non-display period to repeat alternately, and determines a display start timing of the display image based on the motion sensor signal acquired from a sensor signal acquisition section of the head-mounted display, the display period being a period in which the display image is displayed on the display section, and the non-display period being a period in which the display image is not displayed on the display section.

According to another aspect of the invention, there is provided a method for controlling a head-mounted display that is worn on a head of a user, and allows the user to observe a display image, the method comprising:

displaying the display image; and performing a control process that controls a timing at which the display image is displayed, the control process causing a display period and a non-display period to repeat alternately, and setting one display period to be equal to or less than 600 ms, the display period being a period in which the display image is displayed, and the non-display period being a period in which the display image is not displayed.

According to another aspect of the invention, there is provided a method for controlling a head-mounted display that is worn on a head of a user, and allows the user to observe a display image, the method comprising:

displaying the display image;

acquiring a motion sensor signal from a motion sensor that detects a motion of the user; and performing a control process that causes a display period and a non-display period to repeat alternately, and determines a display start timing of the display image based on the acquired motion sensor signal, the display period being a period in which the display image is displayed, and the non-display period being a period in which the display image is not displayed.

DESCRIPTION OF EXEMPLARY EMBODIMENTS

Figure 1B:
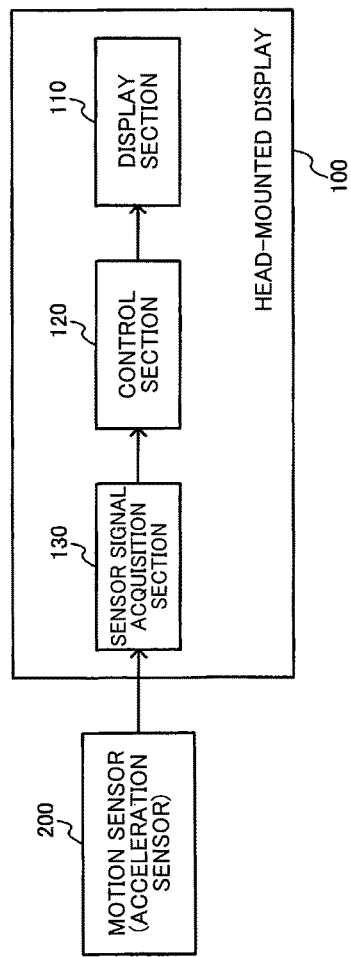
FIGS. 1A and 1B illustrate a system configuration example according to a first embodiment.

A method that displays a display image on a head-mounted display during a period in which the user who wears the head-mounted display performs exercise (e.g., walking or running) has a problem in that the position of the head-mounted display changes along with the motion of the user, and the display image is blurred.

When the head-mounted display has a large size, the size of the battery poses no problem. In recent years, a head-mounted display having a reduced size has been put to practical use, and it has become necessary to use a small battery. However, since a small battery has a small battery capacity, the operating time of the head-mounted display may be limited.

Several embodiments of the invention may provide a head-mounted display, an image display system, an information storage device, a method for controlling a head-mounted display, and the like that make it possible to display the display image so as to reduce blurring while reducing power consumption when the user is walking or running.

According to one embodiment of the invention, one display period is set to be equal to or less than 600 ms. The display image is displayed on the display section during the display period that is set to be equal to or less than 600 ms, and is not displayed on the display section during the non-display period that is a period having a given length.

This makes it possible to display the display image so as to reduce blurring when the user is walking or running.

Since the display image is momentarily displayed instead of always displaying the display image, it is possible to reduce the total display time, and reduce power consumption.

According to one embodiment of the invention, the control section may perform the control process that sets a flight period to be the display period, and displays the display image on the display section during the flight period, the flight period may be a period in which both feet do not make contact with the ground.

This makes it possible not to display the display image at a moment at which at least one foot makes contact with the ground during running, and to prevent a situation in which the display image is blurred, for example.

According to one embodiment of the invention, the control section may perform the control process that determines whether or not the user is in a stationary state, and sets the display period to be equal to or more than 600 ms when it has been determined that the user is in the stationary state.

This makes it possible to display the display image during a period equal to or more than 600 ms when the user is in a stationary state, for example.

According to one embodiment of the invention, there is provided a head-mounted display comprising:

a sensor signal acquisition section that acquires a motion sensor signal from a motion sensor that detects a motion of the user, the control section performing the control process that sets the display period and the non-display period based on the motion sensor signal from the sensor signal acquisition section.

This makes it possible to set the display period so as to avoid the peak of the acceleration in the vertical direction even when the user has changed the pace during walking or running, for example.

According to this embodiment, the motion sensor signal is acquired, and the display start timing is determined based on the motion sensor signal.

This makes it possible to momentarily display the display image at a timing at which the body motion is small in synchronization with the motion sensor attached to the user, and further prevent a situation in which the display image is blurred.

Since the display image is momentarily displayed instead of always displaying the display image, it is possible to reduce the total display time, and reduce power consumption.

According to another embodiment of the invention, the sensor signal acquisition section may acquire an acceleration sensor signal as the motion sensor signal, and the control section may detect peaks of an acceleration of the motion of the user based on the acceleration sensor signal acquired from the sensor signal acquisition section, and set a given period that includes an intermediate timing to be the display period, the intermediate timing being a timing between a first peak and a second peak that have been detected.

This makes it possible to exclude a timing at which the acceleration in the vertical direction reaches a peak from the display period, for example.

According to another embodiment of the invention, the control section may determine whether or not the acceleration has been continuously equal to or less than a given threshold value for a given period, the control section may determine the display start timing of the display image, and display the display image on the display section from the determined display start timing, when it has been determined that the acceleration has been continuously equal to or less than the given threshold value for the given period, and the control section may determine a display end timing of the display image, and causing the display image not to be displayed on the display section at the determined display end timing, when it has been determined that the acceleration has been continuously larger than the given threshold value for the given period.

This makes it possible to determine whether or not the flight period is currently occurring, and set the display start timing and the display end timing, for example.

According to another embodiment of the invention, the control section may perform the control process that determines whether or not the user is in a stationary state based on the motion sensor signal, and continuously displays the display image on the display section when it has been determined that the user is in the stationary state.

This makes it possible to continuously display the display image when the user is in a stationary state, for example.

According to another embodiment of the invention, there is provided a head-mounted display comprising:

an image selection section that selects an icon image from a plurality of icon images displayed on the display section, the sensor signal acquisition section may acquire a first sensor signal and a second sensor signal, the first sensor signal being the motion sensor signal, and the second sensor signal being a sensor signal from a sensor provided to an information terminal device, the display section may display a selection menu screen in which the plurality of icon images are displayed side by side, and the image selection section performing a process that causes an image among the plurality of icon images to be selected instead of a currently selected icon image among the plurality of icon images based on the first sensor signal and the second sensor signal.

This makes it possible to utilize the motion sensor signal for selecting an icon image among the icon images displayed on the display section, and determining the display period, the display start timing, and the like, for example.

According to another embodiment of the invention, there is provided a head-mounted display comprising: a display buffer that stores a plurality of the display images; and an image selection section that selects the display image displayed on the display section, the image selection section may select the display image from the plurality of display images stored in the display buffer based on the motion sensor signal from the sensor signal acquisition section, and the display section may display the selected display image.

This makes it possible to select the display image to be displayed on the display section based on the motion sensor signal, and change the display image in synchronization with the motion of the head of the user, for example.

According to another embodiment of the invention, the sensor signal acquisition section may acquire a display timing motion sensor signal that represents a motion of the user during the display period, and a non-display timing motion sensor signal that represents a motion of the user during the non-display period, and the image selection section may select the display image to be displayed on the display section from the plurality of display images stored in the display buffer based on the display timing motion sensor signal and the non-display timing motion sensor signal.

This makes it possible to detect the motion of the user in the non-display period that follows the display period, and changes the display image in synchronization with the motion of the user in the non-display period, for example.

According to another embodiment of the invention, the image selection section may specify motion information that represents a difference between a direction in which the user faces during the display period and a direction in which the user faces during the non-display period, based on the display timing motion sensor signal and the non-display timing motion sensor signal, and select the display image to be displayed on the display section from the plurality of display images stored in the display buffer based on the specified motion information.

This makes it possible to calculate the angular difference between the direction in which the user faces during the display period and the direction in which the user faces during the non-display period as the motion information, and change the display image to be displayed in the next display period based on the calculated angular difference, for example.

According to another embodiment of the invention, the image selection section may select an initial display image from the plurality of display images stored in the display buffer as the display image to be displayed on the display section when it has been determined that the difference represented by the motion information is smaller than a given threshold value.

This makes it possible to display the initial display image on the display section without requiring the user to perform a special motion (operation), for example.

The head-mounted display may further include a timer section that performs a count process up to the expiration timing of the display period and the expiration timing of the non-display period, the control section may display the display image on the display section when the timer section has started the count process on the display period, the timer section may start the count process up to the expiration timing of the non-display period when the count process up to the expiration timing of the display period has completed, and the control section may stop display of the display image when the timer section has started the count process on the non-display period.

This makes it possible to simplify the process, and reduce the implementation cost, for example.

According to another embodiment of the invention, there is provided a head-mounted display, the control section performing the control process that switches a display state of the display image by causing an illumination light source to emit light during the display period, and causing the illumination light source not to emit light during the non-display period.

According to this configuration, when using an LED or the like as the illumination light source, it is possible to cause the illumination light source to emit using a current equal to more than the rated current, and momentarily display a bright image. This makes it possible to improve visibility, and allow the user to clearly observe the display image even in a bright environment (e.g., outdoors), for example.

First to third embodiments of the invention are described below. The background of each embodiment and an outline of the method according to each embodiment will be described first. A system configuration example, the method, and the flow of the process according to each embodiment will then be described. Note that the following embodiments do not in any way limit the scope of the invention laid out in the claims. Note also that all of the elements described below in connection with the following embodiments should not necessarily be taken as essential elements of the invention.

1. Outline

A device has been proposed that senses the state of an athlete, a person who performs health-care exercise, or the like, and feeds back the resulting information to the user. According to such a device, the user can perform appropriate exercise based on the information fed back to the user, and the effect of exercise can be improved, for example.

However, it is difficult or troublesome to hold an information display (information terminal) with the hand during exercise. Since a head-mounted display was normally designed to have a large size, and cover the head of the user, it was difficult to use a head-mounted display during exercise.

In recent years, the size of a head-mounted display has been reduced, and a head-mounted display that can be used in a mobile environment (e.g., outdoors) has been developed. In view of the above situation, use of a head-mounted display to feedback information (e.g., exercise condition information) to the user during exercise has been studied.

For example, JP-A-2011-067277 discloses a technique that displays the running distance and the running pace on a head-mounted display while the user is running.

However, the technique disclosed in JP-A-2011-067277 has a problem in that the display image is blurred due to the motion of the user when the user observes the display image (display information) displayed on the head-mounted display during walking or running.

It is considered that a human brain performs a blur correction process along with the motion of the body so that a fixed object in the real space can be easily observed. Therefore, a human can clearly observe the surrounding objects (e.g., desk, chair, and street trees) even during walking or running.

On the other hand, a display secured on the head of the user moves (i.e., changes in position) along with the motion of the body of the user. Therefore, it is unnecessary to perform the blur correction process on the display image displayed on the head-mounted display that changes in position along with the motion of the body of the user. However, a human brain also performs the blur correction process on such a display image. As a result, the blur correction process may fail, and the display image may be blurred.

According to the first to third embodiments, the display image is displayed only during a given period instead of always displaying the display image in order to solve the above problems. This makes it possible to reduce the effects of blurring, and allow the user to easily observe the display image.

It was found that a human normally walks about 100 steps per minute. In this case, the time required for a human to walk one step is about 600 ms.

In the first embodiment, the effects of blurring are reduced by displaying the display image for a time shorter than the time required for a human to walk one step (i.e., a time equal to or less than 600 ms).

Since an impact is transmitted to the entire body of the user during walking or running at a moment at which the foot of the user makes contact with the ground, the position of the head-mounted display changes to a large extent at such a moment. Therefore, it is considered that it is possible to display information so that the user can easily observe the information even during walking or running by displaying the display image during a period in which the motion of the user is a minimum without displaying the display image at a moment at which the foot of the user makes contact with the ground.

In the second embodiment, the display image is displayed at a timing other than the timing at which the foot of the user makes contact with the ground based on the waveform from a motion sensor such as an acceleration sensor. Alternatively, the display image is displayed cyclically in synchronization with a cyclic waveform from the motion sensor.

In the third embodiment, the display image is displayed (or is not displayed) cyclically by utilizing a timer.

When the head-mounted display has a large size, the size of the battery poses no problem. In recent years, a head-mounted display having a reduced size has been put to practical use, and it has become necessary to use a small battery. However, since a small battery has a small battery capacity, the operating time of the head-mounted display may be limited. According to the first to third embodiments, since the display image is momentarily displayed instead of always displaying the display image, it is possible to reduce the total display time, and reduce power consumption. The first to third embodiments are described in detail below.

2. First Embodiment 2.1. System Configuration Example

Figure 1A:
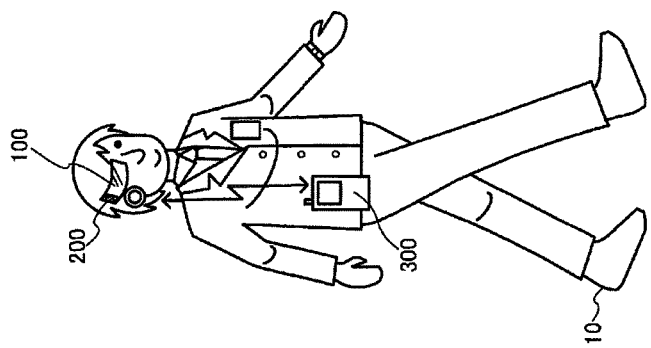

FIG. 1A illustrates a state in which a user 10 wears a head-mounted display 100. In the first embodiment, a motion sensor 200 is attached to the head-mounted display 100 that is worn on the head of the user 10, and the motion of the head of the user 10 can be detected by the motion sensor 200. Note that the motion sensor 200 need not necessarily be attached to the head-mounted display 100 or the head of the user 10. The motion sensor 200 may be attached to another part of the user 10. An information terminal device 300 illustrated in FIG. 1A is described later in connection with the second embodiment.

FIG. 1B illustrates a configuration example of the head-mounted display 100 according to the first embodiment, and an image display system that includes the head-mounted display 100.

The head-mounted display (display device) 100 includes a display section 110, a control section 120, and a sensor signal acquisition section 130. The image display system may be a device in which the motion sensor 200 is attached to the head-mounted display 100, for example. Note that the configuration of the head-mounted display 100 and the image display system that includes the head-mounted display 100 is not limited to the configuration illustrated in FIG. 1B. Various modifications may be made, such as omitting some of the elements illustrated in FIG. 1B, or adding other elements.

The connection relationship between each section is described below. The motion sensor (acceleration sensor) 200 is connected to the sensor signal acquisition section 130, and the sensor signal acquisition section 130 is connected to the control section 120. The control section 120 is connected to the display section 110.

The process performed by each section is described below.

The display section 110 displays a display image during a display period determined by the control section 120. The display section 110 may be implemented by a liquid crystal display, an organic EL display, electronic paper, or the like.

The control section 120 performs a control process that controls the timing at which the display image is displayed on the display section. The function of the control section 120 may be implemented by hardware such as a processor (e.g., CPU) or an ASIC (e.g., gate array), a program, or the like.

The sensor signal acquisition section 130 acquires a motion sensor signal from the motion sensor 200. The sensor signal acquisition section 130 is a communication section that communicates with the motion sensor 200 and the like via cable or wireless communication, for example. The sensor signal acquisition section 130 acquires an acceleration sensor signal as the motion sensor signal, for example.

The motion sensor 200 detects the motion sensor signal, and transmits the motion sensor signal to the sensor signal acquisition section 130. The motion sensor 200 is an acceleration sensor, for example. In this case, the motion sensor 200 detects an acceleration sensor signal as the motion sensor signal. The acceleration sensor includes a device that changes in resistance value due to an external force, for example. The acceleration sensor detects triaxial acceleration information. The acceleration sensor may be a hexaxial acceleration sensor that detects the moment around each axis in addition to the triaxial force. The motion sensor is not limited to an acceleration sensor, but may be a direction sensor such as a terrestrial magnetism sensor or a gyro sensor, for example. The direction sensor measures the direction (angle: 0 to 360°) of the sensor. The terrestrial magnetism sensor includes a device that changes in resistance value or impedance value corresponding to the magnitude of a magnetic field, for example. The terrestrial magnetism sensor detects triaxial terrestrial magnetism information. The motion sensor may be a sensor that functions as the terrestrial magnetism sensor, the acceleration sensor, and the gyro sensor.

2.2. Method

The head-mounted display 100 according to the first embodiment is worn on the head of the user 10, and allows the user 10 to observe the display image, the head-mounted display 100 including the display section 110 that displays the display image, and the control section 120 that performs the control process that controls the timing at which the display image is displayed on the display section 110. The control section 120 performs the control process that causes a display period and a non-display period to repeat alternately, and sets one display period to be equal to or less than 600 ms, the display period being a period in which the display image is displayed on the display section 110, and the non-display period being a period in which the display image is not displayed on the display section 110.

Figure 2A:
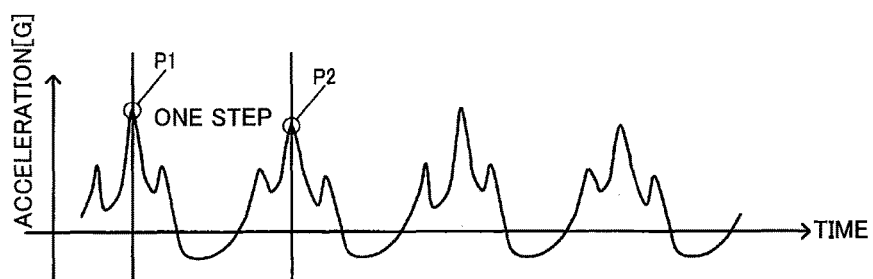
FIGS. 2A and 2B are views illustrating a method that sets a display period to be equal to or less than 600 ms.

A specific example is described below with reference to FIGS. 2A and 2B. FIG. 2A illustrates a graph showing the acceleration (G) during walking (vertical axis: acceleration in the vertical direction, horizontal axis: time). As illustrated in FIG. 2A, the acceleration in the vertical direction successively changes during walking, and peaks (e.g., P1 and P2) are observed cyclically. Specifically, the acceleration reaches a peak at a timing at which the foot of the user has made contact with the ground. Therefore, a period from one peak to the next peak is a period corresponding to about one step. The display image is normally blurred to the largest extent when the acceleration in the vertical direction reaches a peak.

It has been statistically found that the time required for a human to walk 100 steps is about 1 minute. In this case, the time required for a human to walk one step is about 600 ms.

Specifically, the display image is blurred to a large extent during walking when the acceleration in the vertical direction is high (when the foot of the user makes contact with the ground), and is blurred to only a small extent when the acceleration in the vertical direction is low. The acceleration in the vertical direction changes so that a peak is reached in a cycle of about 600 ms.

Therefore, a situation in which the display image is blurred can be suppressed by displaying the display image during a period in which the acceleration in the vertical direction is low without displaying the display image during a period in which the acceleration in the vertical direction is high.

In the first embodiment, one display period is set to be equal to or less than 600 ms (see FIG. 2B) in order to prevent a situation in which the display image is displayed when the acceleration reaches a peak.

Figure 2B:
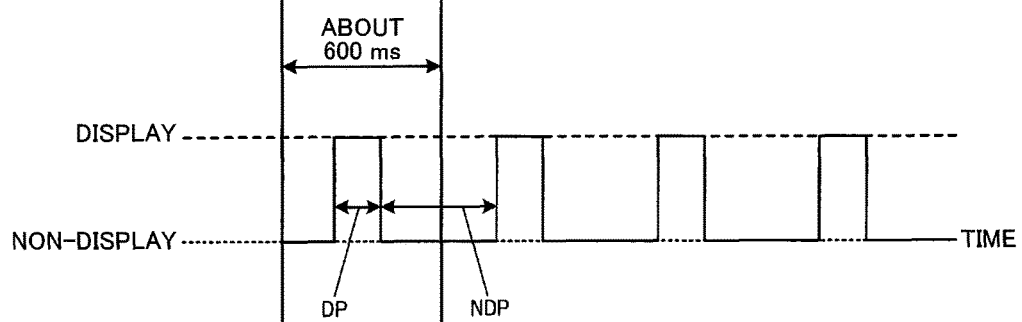

Note that the term "one display period" used herein refers to a period in which the display image is continuously displayed on the display section 110 when the display period and the non-display period repeat alternately (see FIG. 2B). For example, the term "one display period" refers to a display period DP.

The display image is displayed on the display section 110 during the display period DP that is set to be equal to or less than 600 ms, and is not displayed on the display section 110 during a non-display period NDP that is a period having a given length. The length of the display period DP and the length of the non-display period NDP can be arbitrarily set. For example, a period obtained by subtracting the display period DP from 600 ms may be set to be the non-display period NDP.

It is desirable to set the display period DP to be equal to or less than 300 ms in order to further reduce the effects of blurring. However, if the display period is too short, it is difficult for the user to observe the display image. Therefore, it is desirable to set the display period to be equal to or more than 20 ms.

The time required for the user to walk one step may be measured in advance, and a period obtained by subtracting the display period from the measured (calculated) period may be set to be the non-display period, for example. A period that is shorter than the above cycle (600 ms) may be randomly set to be the display period. Note that the display period need not necessarily be provided corresponding to every step. For example, the display image may be displayed every four steps, or may be displayed when a given time has elapsed from the preceding display timing. The display period and the non-display period may be set using an arbitrary method other than the above methods and the methods described later.

The above configuration makes it possible to display the display image so as to reduce blurring when the user is walking or running.

According to the first embodiment, since the display image is momentarily displayed instead of always displaying the display image, it is possible to reduce the total display time, and reduce power consumption. Therefore, a small battery can be used, for example. This makes it possible to reduce the weight of the device, and reduce the burden imposed on the body of the user during exercise, for example.

For example, a flight period (flight phase) (described in detail later with reference to FIGS. 5A and 5B) occurs during running. The acceleration in the vertical direction decreases during the flight period as compared with a period in which one foot or both feet make contact with the ground. Therefore, it is considered that the display image is blurred to only a small extent when the display image is displayed during the flight period, and is not displayed during a period other than the flight period.

Therefore, the control section 120 may perform the control process that sets a flight period in which both feet do not make contact with the ground to be the display period, and displays the display image on the display section 110 during the flight period.

The term "flight period" used herein refers to a period in which the body weight is not applied to both feet. Specifically, the term "flight period" refers to a period between a period in which the left foot makes contact with the ground and a period in which the right foot makes contact with the ground. The period BG illustrated in FIG. 5A corresponds to the flight period.

This makes it possible not to display the display image at a moment at which at least one foot makes contact with the ground during running, and to prevent a situation in which the display image is blurred, for example.

It has been statistically found that a human runs 180 to 200 steps per minute. In this case, the time required for a human to run one step is about 350 ms. Therefore, it is desirable to set the display period to be equal to or less than 350 ms during running. In order to further reduce blurring, it is desirable to set only a period in which a change in acceleration is stable (i.e., flight period) to be the display period (i.e., set the display period to be equal to or less than about 175 ms).

When the user is in a stationary state without walking, running, or the like, the body of the user normally does not make a swinging motion, and the head-mounted display also does make a swinging motion. Therefore, the display image is rarely blurred. Specifically, it is unnecessary to set the display period to be equal to or less than 600 ms when the user is in a stationary state. When the user is in a stationary state, the user can normally easily observe the display image when the display period is long.

Therefore, the control section 120 may perform the control process that determines whether or not the user 10 is in a stationary state, and sets the display period to be equal to or more than 600 ms when it has been determined that the user is in a stationary state.

This makes it possible to display the display image during a period equal to or more than 600 ms when the user is in a stationary state, for example. For example, the control section 120 may perform the control process so that the display image is always displayed.

It is possible to further reduce blurring by detecting a period in which a change in acceleration is small in synchronization with the acceleration sensor, and setting the detected period to be the display period.

The user does not necessarily walk or run in a constant cycle, and may change the pace during walking or running.

Therefore, the head-mounted display 100 according to the first embodiment may include the sensor signal acquisition section 130 that acquires the motion sensor signal from the motion sensor 200 that detects the motion of the user 10. The control section 120 may perform the control process that sets the display period and the non-display period based on the motion sensor signal from the sensor signal acquisition section 130.

This makes it possible to set the display period so as to avoid the peak of the acceleration in the vertical direction even when the user has changed the pace during walking or running, for example.

2.3. Flow of Process

Figure 3:
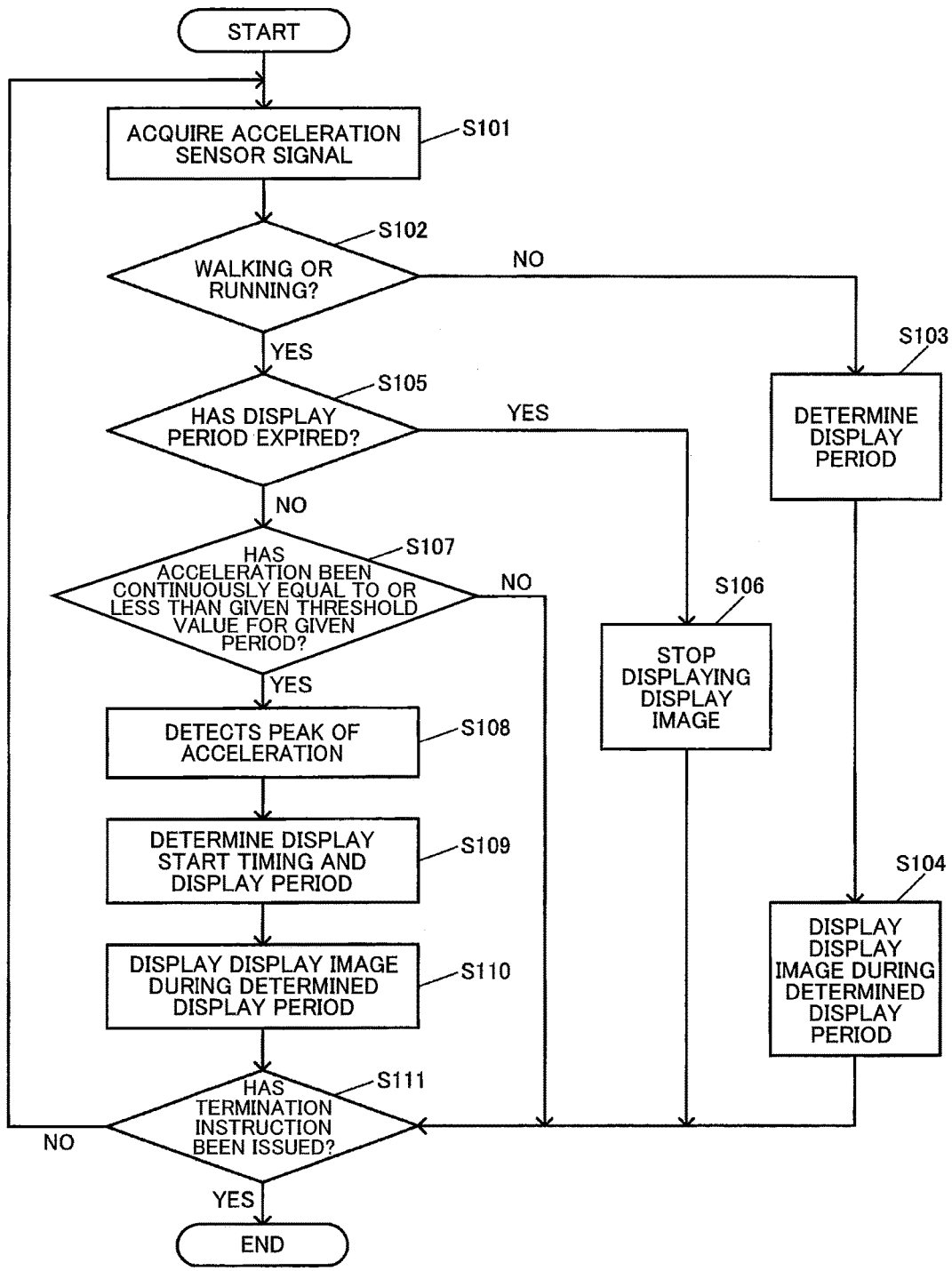
FIG. 3 is a flowchart illustrating the flow of a process according to the first embodiment.

The flow of the process according to the first embodiment is described below using the flowchart illustrated in FIG. 3.

The sensor signal acquisition section 130 acquires the acceleration sensor signal (S101). The sensor signal acquisition section 130 transmits the acquired acceleration sensor signal to the control section 120, and the control section 120 determines whether or not the user is walking or running based on the acquired acceleration sensor signal (S102).

When it has been determined that the user is not walking or running in the step S102, the display period of the display image is determined (S103), and the display image is displayed on the display section 110 during the determined display period (S104). Whether or not a display control process termination instruction has been issued is then determined (S111). When it has been determined that the termination instruction has been issued, the process is terminated. When it has been determined that the termination instruction has not been issued, the step S101 is performed again.

The termination instruction may be an instruction (information) that instructs to turn OFF the head-mounted display, or an instruction (information) that instructs to stop the display control process, for example. The instruction that instructs to turn OFF the head-mounted display is input by the user through an I/F section (e.g., power switch) of the head-mounted display, for example. The instruction that instructs to stop the display control process is input through an operation section that is provided to the head-mounted display or an information terminal that communicates with the head-mounted display. Note that the I/F section and the operation section are not illustrated in FIG. 1 and the like.

When it has been determined that the user is walking or running in the step S102, the control section 120 determines whether or not the display period has expired (S105). When it has been determined that the display period has expired, the display image is not displayed on the display section 110 (S106). Whether or not the termination instruction has been issued is then determined (S111). When it has been determined that the termination instruction has been issued, the process is terminated. When it has been determined that the termination instruction has not been issued, the step S101 is performed again.

When it has been determined that the display period has not expired in the step S105, the control section 120 determines whether or not the acceleration has been continuously equal to or less than a given threshold value for a given period (S107).

When it has been determined that the acceleration has been continuously equal to or less than the given threshold value for the given period, the control section 120 detects the peak of the acceleration (S108), and determines the display start timing and the display period (S109). The display image is displayed on the display section 110 during the display period that starts from the determined display start timing (S110). Whether or not the termination instruction has been issued is then determined (S111). When it has been determined that the termination instruction has been issued, the process is terminated. When it has been determined that the termination instruction has not been issued, the step S101 is performed again.

When it has been determined that the acceleration has been continuously larger than the given threshold value for the given period in the step S107, the display control process is not performed, and whether or not the termination instruction has been issued is determined (S111). When it has been determined that the display control process termination instruction has been issued, the process is terminated. When it has been determined that the termination instruction has not been issued, the step S101 is performed again.

3. Second Embodiment 3.1. System Configuration Example

In the second embodiment, the user 10 wears the head-mounted display 100 and the motion sensor 200 on his head, and wears the information terminal device 300 on his body (see FIG. 1A). Note that the user 10 may wear the motion sensor 200 and the information terminal device 300 at an arbitrary position.

Figure 4:
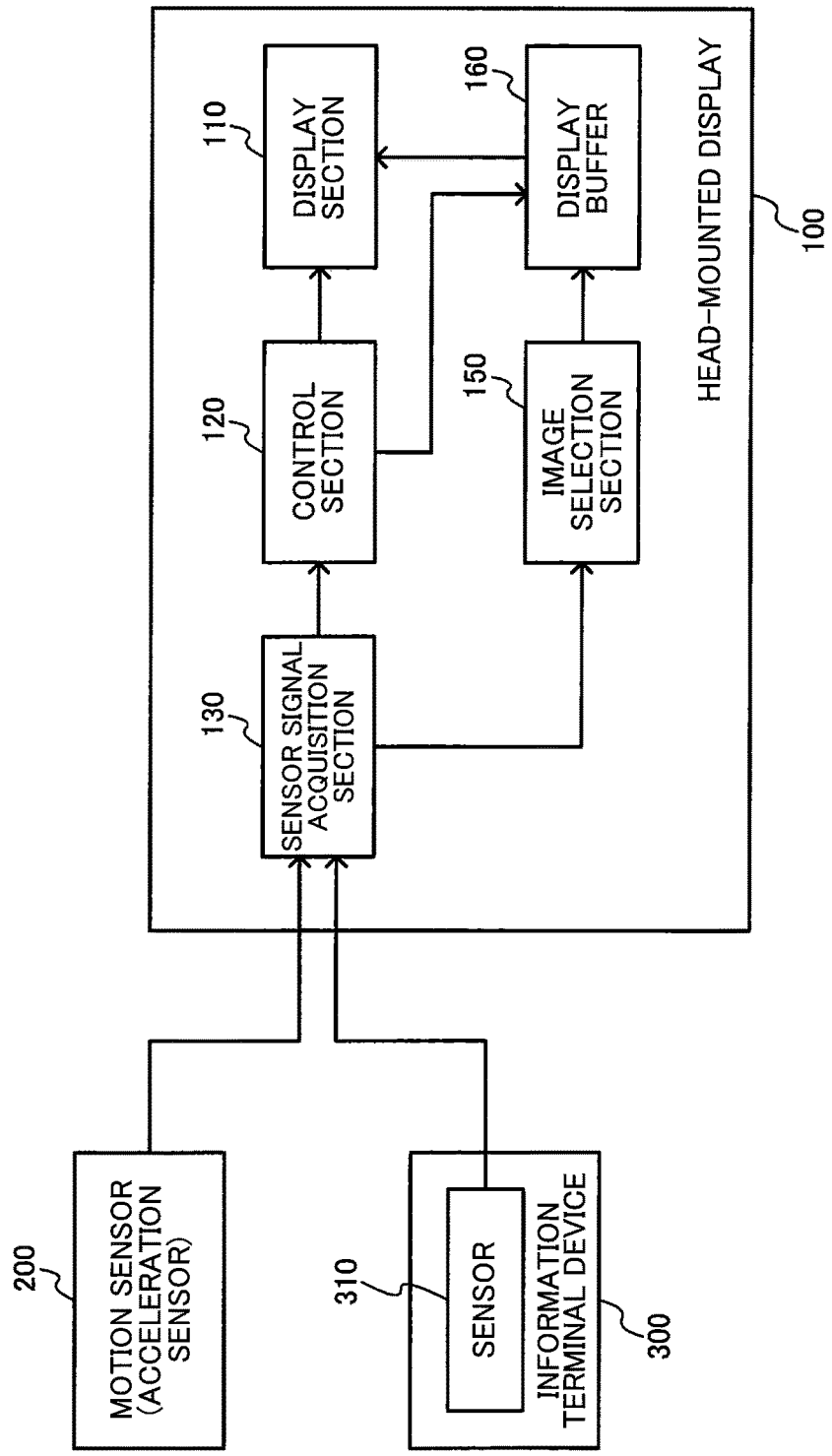
FIG. 4 illustrates a system configuration example according to a second embodiment.

FIG. 4 illustrates a configuration example of the head-mounted display 100 according to the second embodiment and an image display system that includes the head-mounted display 100.

The head-mounted display 100 includes a display section 110, a control section 120, a sensor signal acquisition section 130, an image selection section 150, and a display buffer 160. The image display system includes the head-mounted display 100, the motion sensor 200, and the information terminal device 300. Note that the configuration of the head-mounted display 100 and the image display system that includes the head-mounted display 100 is not limited to the configuration illustrated in FIG. 4. Various modifications may be made, such as omitting some of the elements illustrated in FIG. 4, or adding other elements.

The connection relationship between each section is described below. The motion sensor (acceleration sensor) 200 and a sensor 310 included in the information terminal device 300 are connected to the sensor signal acquisition section 130, and the sensor signal acquisition section 130 are connected to the control section 120 and the image selection section 150. The control section 120 is connected to the display section 110 and the display buffer 160. The image selection section 150 is connected to the display buffer 160, and the display buffer 160 is connected to the display section 110.

The process performed by each section is described below. The display section 110, the control section 120, and the motion sensor 200 are configured in the same manner as described above in connection with the first embodiment, and description thereof is omitted. The function of the image selection section 150 is described later.

The sensor signal acquisition section 130 acquires a sensor signal from the sensor 310 included in the information terminal device 300 in addition to the motion sensor signal from the motion sensor 200.

The display buffer 160 includes an image storage area that stores a plurality of display images and a plurality of icon images. Image data about the plurality of display images and the plurality of icon images is stored in the image storage area according to a given display layout. The image storage area of the display buffer 160 may be implemented by a memory (e.g., RAM), a hard disk drive (HDD), or the like.

The information terminal device 300 is a portable device (electronic device) such as a smartphone, and includes the sensor 310. The sensor 310 may be the acceleration sensor, the direction sensor, the gyro sensor, or the like described above in connection with the motion sensor 200 according to the first embodiment.

3.2. Method

The head-mounted display 100 according to the second embodiment is worn on the head of the user 10, and allows the user 10 to observe the display image, the head-mounted display 100 including the display section 110 that displays the display image, the control section 120 that performs the control process that controls the timing at which the display image is displayed on the display section 110, and the sensor signal acquisition section 130 that acquires the motion sensor signal from the motion sensor 200 that detects the motion of the user 10. The control section 120 performs the control process that causes a display period and a non-display period to repeat alternately, and determines the display start timing of the display image based on the motion sensor signal acquired from the sensor signal acquisition section 130, the display period being a period in which the display image is displayed on the display section 110, and the non-display period being a period in which the display image is not displayed on the display section 110.

The motion sensor signal refers to a signal that is acquired by the sensor signal acquisition section 130 from the motion sensor 200. The motion sensor signal may be an acceleration sensor signal, a gyro sensor signal, or a direction sensor signal, for example.

Figures 5A, 5B:
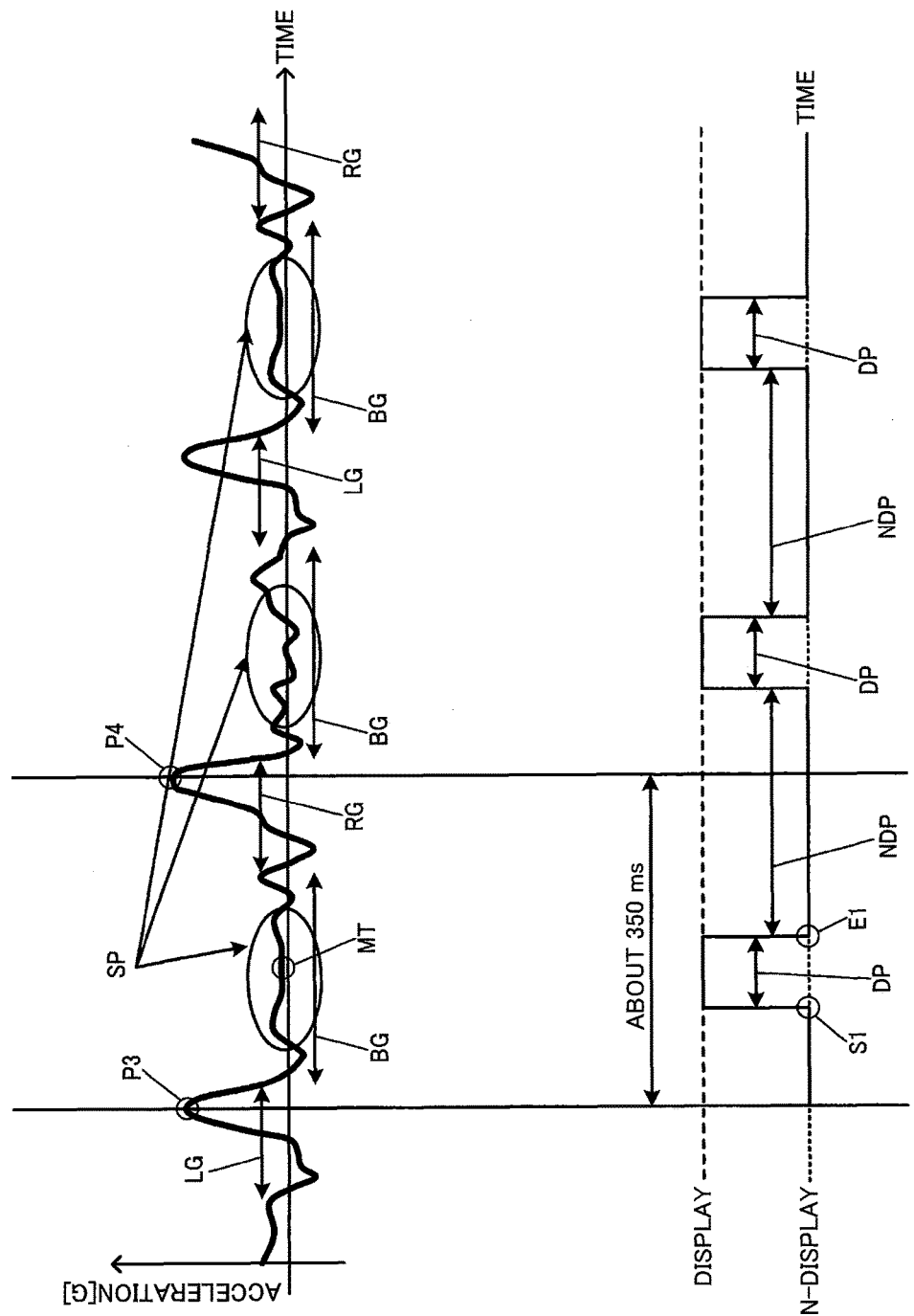
FIGS. 5A and 5B are views illustrating a method that sets a display period based on acceleration.

A specific example is described below with reference to FIGS. 5A and 5B. FIG. 5A illustrates a graph showing the acceleration (G) during running (vertical axis: acceleration in the vertical direction, horizontal axis: time). As illustrated in FIG. 5A, the acceleration in the vertical direction successively changes during running in the same manner as during walking, and peaks (e.g., P3 and P4) are observed cyclically. Specifically, the acceleration reaches a peak at a timing at which the foot of the user has made contact with the ground. Therefore, a period from one peak to the next peak is a period corresponding to about one step. The display image is normally blurred to the largest extent when the acceleration in the vertical direction reaches a peak in the same manner as during walking.

A flight period BG (i.e., a period in which both feet do not make contact with the ground) occurs during running, differing from walking. The flight period BG refers to a period between a left-foot contact period LG in which only the left foot makes contact with the ground and a right-foot contact period RG in which only the right foot makes contact with the ground. As illustrated in FIG. 5A, the acceleration in the vertical direction observed during the flight period BG is lower than those observed during the left-foot contact period LG and the right-foot contact period RG. Specifically, the motion (i.e., change in position) of the head-mounted display is small during the flight period BG, and the display image is rarely blurred.

In the second embodiment, the motion sensor signal is acquired, and the display start timing is determined based on the motion sensor signal. As illustrated in FIG. 5B, a given timing S1 within the flight period is determined to be the display start timing to set the display period DP, for example. Note that the display period DP and the non-display period NDP are set using an arbitrary method such as the method described above in connection with the first embodiment.

This makes it possible to momentarily display the display image at a timing at which the body motion is small in synchronization with the motion sensor attached to the user, and further prevent a situation in which the display image is blurred. It is also possible to reduce power consumption, and reduce the burden imposed on the user (see the first embodiment), for example.

The sensor signal acquisition section 130 may acquire an acceleration sensor signal as the motion sensor signal, for example. The control section 120 may detect the peaks of the acceleration of the motion of the user 10 based on the acceleration sensor signal acquired from the sensor signal acquisition section 130, and set a given period that includes an intermediate timing between a first peak and a second peak that have been detected to be the display period.

The motion of the user 10 refers to the motion of the head of the user 10, for example.

The intermediate timing between the first peak and the second peak refers to an arbitrary timing MT during a period between a first peak P3 and a second peak P4 (see FIG. 5A), for example. When an arbitrary timing MT during the flight period BG is set to be the intermediate timing between the first peak and the second peak, a period that includes part or the entirety of the flight period can be set to be the display period. Although an example in which the first peak is the peak P3 illustrated in FIG. 5A, and the second peak is the peak P4 illustrated in FIG. 5A, has been described above, the first peak may be a peak other than the peak P3, and the second peak may be a peak other than the peak P4.

This makes it possible to exclude a timing at which the acceleration in the vertical direction reaches a peak from the display period, for example.

Whether or not the flight period is currently occurring may be determined using the following method, for example.

For example, the control section 120 may determine whether or not the acceleration has been continuously equal to or less than a given threshold value for a given period. When it has been determined that the acceleration has been continuously equal to or less than the given threshold value for the given period, the control section 120 may determine the display start timing, and display the display image on the display section 110 from the determined display start timing. When it has been determined that the acceleration has been continuously larger than the given threshold value for the given period, the control section 120 may determine the display end timing of the display image, and cause the display image not to be displayed on the display section 110 at the determined display end timing.

Specifically, when it has been determined that the acceleration has been continuously equal to or less than the given threshold value for the given period, the control section 120 determines that the flight period is currently occurring, and determines the display start timing in order to display the display image. Note that the timing at which it has been determined that the flight period has occurred may be set to be the display start timing, or an arbitrary timing that occurs when a given period has elapsed after the timing at which it has been determined that the flight period has occurred may be set to be the display start timing. In FIG. 5B, the timing S1 is the display start timing.

When it has been determined that the acceleration has been continuously larger than the given threshold value for the given period, the control section 120 determines that the flight period is not currently occurring, and determines the display end timing so that the display image is not displayed. Note that the timing at which it has been determined that the flight period is not currently occurring may be set to be the display end timing, or an arbitrary timing that occurs when a given period has elapsed after the timing at which it has been determined that the flight period is not currently occurring may be set to be the display end timing. In FIG. 5B, the timing E1 is the display end timing.

This makes it possible to determine whether or not the flight period is currently occurring, and set the display start timing and the display end timing, for example. When the display end timing is set together with the display start timing, the display period is automatically specified. Therefore, it is unnecessary to set the display period using the method described above in connection with the first embodiment, for example.

When the user is in a stationary state, the display image is rarely blurred (see the first embodiment). Therefore, it is unnecessary to intermittently display the display image when the user is in a stationary state. Specifically, it is unnecessary to set the display start timing and the display end timing when the user is in a stationary state.

Therefore, the control section 120 may perform the control process that determines whether or not the user 10 is in a stationary state based on the motion sensor signal, and continuously displays the display image on the display section 110 when it has been determined that the user 10 is in a stationary state.

This makes it possible to continuously display the display image when the user 10 is in a stationary state, for example.

Although an example in which the motion sensor signal is used to determine the display period, the display start timing, and the like has been described above, it is also possible to use the motion sensor signal for the following applications and the like.

Figure 7:
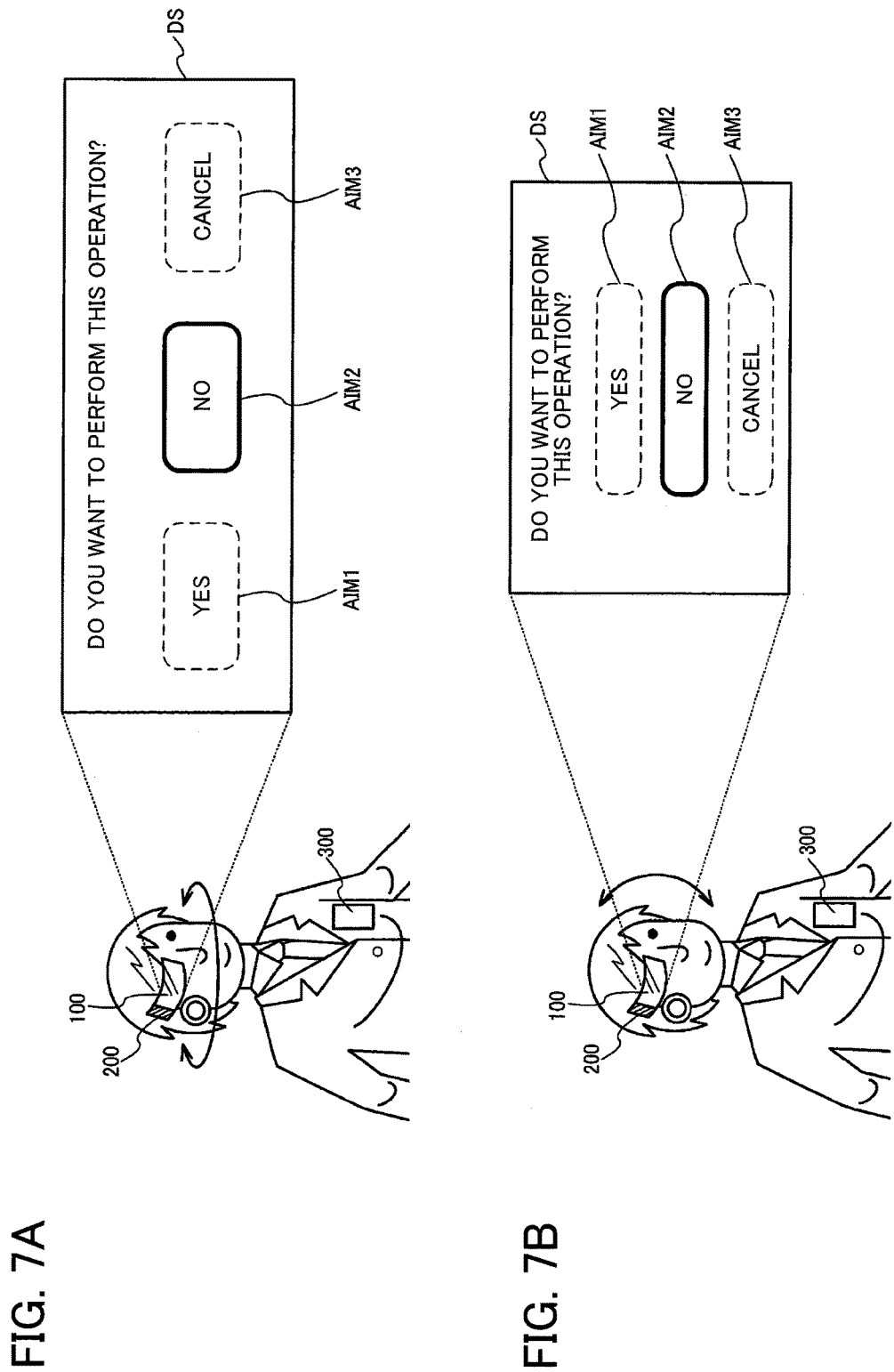
FIGS. 7A and 7B are views illustrating a method that selects an icon image based on two sensor signals.

For example, the display section 110 may display a selection menu screen DS illustrated in FIG. 7A or FIG. 7B. In this case, icon images "YES" (AIM1), "NO" (AIM2), and "CANCEL" (AIM3) may be displayed within the selection menu screen DS as an answer to the question "DO YOU WANT TO PERFORM THIS OPERATION?".

In this case, the user selects the desired icon image from the icon images AIM1 to AIM3. In the second embodiment, an icon image is selected in synchronization with the motion of the neck of the user. In FIGS. 7A and 7B, the icon image enclosed by a bold line (frame) has been selected. Specifically, the icon image "NO" (AIM2) has been selected in FIGS. 7A and 7B.

A specific example in which an icon image is selected in such a way is described below. For example, when the motion sensor 200 is attached to the head of the user, and the information terminal device 300 includes the sensor 310, the difference between the direction of the body of the user and the direction of the head of the user is calculated based on the sensor signal acquired from the sensor 310 and the motion sensor signal. When it has been determined that the head faces in the rightward direction with respect to the body, the right icon ("CANCEL" (AIM3) in FIG. 7A) is selected. When it has been determined that the head faces in the leftward direction with respect to the body, the left icon ("YES" (AIM1) in FIG. 7A) is selected. When it has been determined that the body and the head face in almost the same direction, the center icon ("NO" (AIM2) in FIG. 7A) is selected. In the example illustrated in FIG. 7B, an icon image is selected in the same manner as described above corresponding to the vertical motion of the head of the user.

Specifically, the head-mounted display 100 according to the second embodiment may include the image selection section 150 that selects an icon image from a plurality of icon images displayed on the display section 110. In this case, the sensor signal acquisition section 130 may acquire a first sensor signal and a second sensor signal, the first sensor signal being the motion sensor signal, and the second sensor signal being a sensor signal from the sensor 310 provided to the information terminal device 300. The display section 110 may display a selection menu screen (e.g., the selection menu screen DS illustrated in FIG. 7A) in which a plurality of icon images are displayed side by side. The image selection section 150 may perform a process that causes an image among the plurality of icon images to be selected instead of a currently selected icon image among the plurality of icon images based on the first sensor signal and the second sensor signal.

This makes it possible to utilize the motion sensor signal for selecting an icon image among the icon images displayed on the display section 110, and determining the display period, the display start timing, and the like, for example. Therefore, when the head-mounted display includes a motion sensor for selecting an icon image, it is unnecessary to provide an additional motion sensor in order to determine the display period and the like (i.e., the configuration of the existing head-mounted display can be used to determine the display period and the like).

Figure 10:
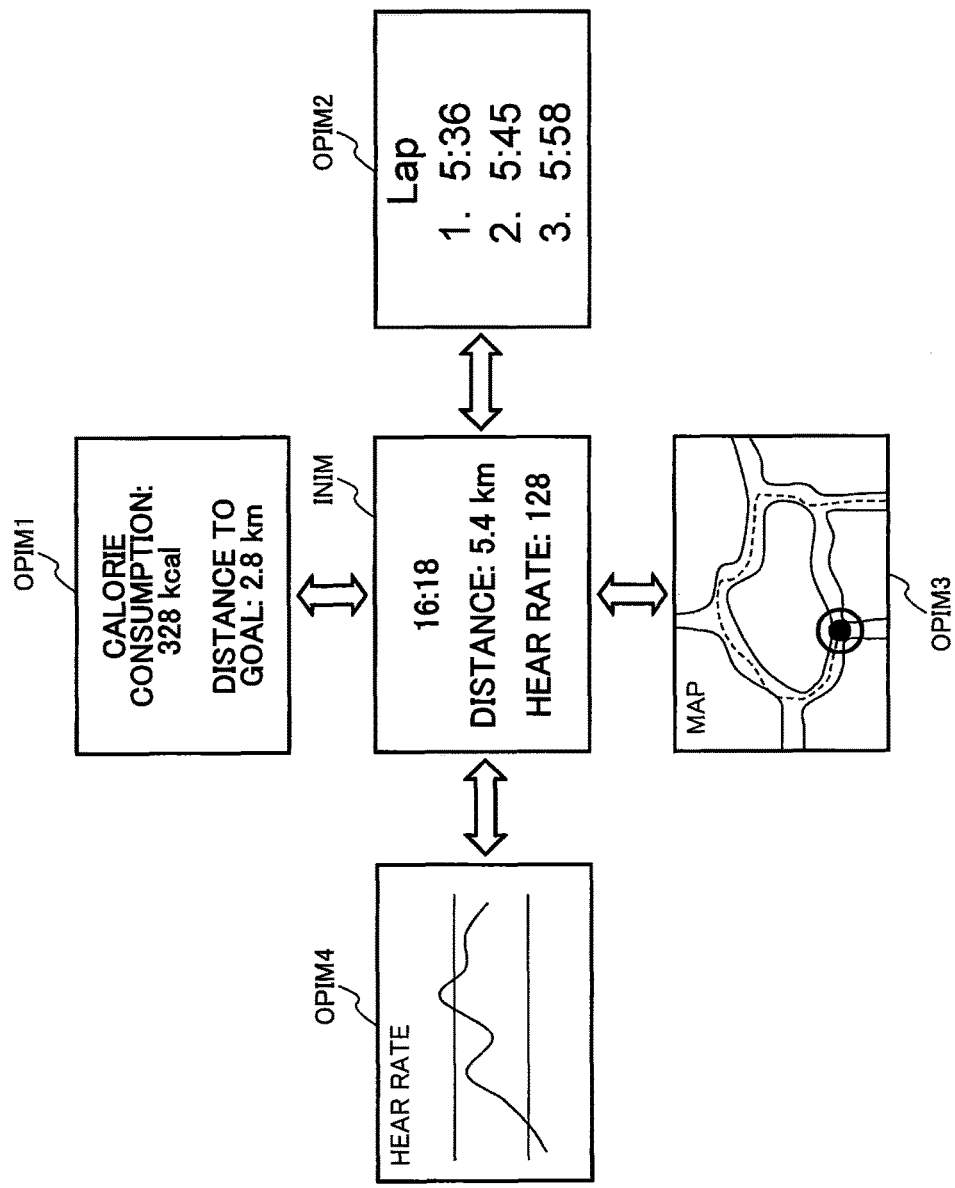
FIG. 10 illustrates an example of a change in screen along with the motion of the head of a user (second embodiment).

The motion sensor signal may also be used for the following applications, for example. A specific example is described below with reference to FIG. 10.

For example, a motion sensor is provided to a head-mounted display, and the user exercises in a state in which the user wears the head-mounted display on his head. The head-mounted display includes the display buffer 160, and a plurality of different display images (INIM, and OPIM1 to OPIM4) are stored in the display buffer 160 according to the display layout illustrated in FIG. 10.

In this case, the initial display image INIM is displayed on the display section in an initial state. The initial display image INIM represents the current time, the moving distance of the user, the heart rate of the user, and the like. The display image OPIM1 represents calorie consumption and the distance to the goal, the display image OPIM2 represents a lap time, the display image OPIM3 represents a map around the user, and the display image OPIM4 represents a graph of the heart rate of the user. Note that these display images are merely examples. The display image is not limited to these display images.

The motion sensor signal that represents the motion of the user during the display period DP illustrated in FIG. 5B (hereinafter referred to as "display timing motion sensor signal"), and the motion sensor signal that represents the motion of the user during the non-display period NDP illustrated in FIG. 5B (hereinafter referred to as "non-display timing motion sensor signal"), are then acquired. The motion of the head of the user during the display period DP and the non-display period NDP is detected based on the display timing motion sensor signal and the non-display timing motion sensor signal. For example, the motion angle of the head of the user during a period from a given timing within the non-display period to a given timing within the display period is calculated.

When it has been determined that the head of the user has moved in the upward direction (i.e., when it has been determined that the upward motion angle is equal to or larger than a given threshold value), the display image displayed in the next display period is changed from the initial display image INIM to the display image OPIM1, and the display image OPIM1 is displayed on the display section in the next display period.

When it has been determined that the head of the user has moved in the rightward direction, the display image OPIM2 is displayed on the display section in the next display period. When it has been determined that the head of the user has moved in the leftward direction, the display image OPIM4 is displayed on the display section in the next display period. When it has been determined that the head of the user has moved in the downward direction, the display image OPIM3 is displayed on the display section in the next display period.

When it has been determined that the head of the user has not moved to a large extent for a given time (i.e., when it has been determined that the motion angle of the head of the user has been smaller than the given threshold value), the initial display image INIM is displayed on the display section in the next display period. The initial state is thus recovered.

Specifically, the head-mounted display 100 according to the second embodiment may include the display buffer 160 that stores a plurality of display images, and the image selection section 150 that selects the display image to be displayed on the display section 110. The image selection section 150 may select the display image from the plurality of display images stored in the display buffer 160 based on the motion sensor signal from the sensor signal acquisition section 130. The display section 110 may display the selected display image.

This makes it possible to select the display image to be displayed on the display section based on the motion sensor signal, and change the display image in synchronization with the motion of the head of the user, for example.

The sensor signal acquisition section 130 may acquire the display timing motion sensor signal that represents the motion of the user during the display period, and the non-display timing motion sensor signal that represents the motion of the user during the non-display period. In this case, the image selection section 150 may select the display image to be displayed on the display section 110 from the plurality of display images stored in the display buffer 160 based on the display timing motion sensor signal and the non-display timing motion sensor signal.

The display timing motion sensor signal refers to the motion sensor signal that represents the motion of the user within the display period. The timing at which the sensor signal acquisition section acquires the display timing motion sensor signal is not limited to a timing within the display period. The sensor signal acquisition section may acquire the display timing motion sensor signal during the non-display period or the next display period, for example. The display timing motion sensor signal may be a signal that represents the motion of the user over the entire period from the start timing S1 to the end timing E1 of the display period DP illustrated in FIG. 5B, or may be a signal that represents the motion of the user in a given period within the display period DP, for example.

The non-display timing motion sensor signal refers to the motion sensor signal that represents the motion of the user within the non-display period. The acquisition timing, the details, and the like of the non-display timing motion sensor signal are the same as described above in connection with the display timing motion sensor signal.

This makes it possible to detect the motion of the user in the non-display period that follows the display period, and changes the display image in synchronization with the motion of the user in the non-display period, for example.

Specifically, the image selection section 150 may specify motion information that represents the difference between the direction in which the user faces during the display period and the direction in which the user faces during the non-display period, based on the display timing motion sensor signal and the non-display timing motion sensor signal, and select the display image to be displayed on the display section 110 from the plurality of display images stored in the display buffer 160 based on the specified motion information.

The motion information refers to information that represents the difference between the direction in which the user faces during the display period and the direction in which the user faces during the non-display period. The motion information may be angle information, for example.

This makes it possible to calculate the angular difference between the direction in which the user faces during the display period and the direction in which the user faces during the non-display period as the motion information, and change the display image to be displayed in the next display period based on the calculated angular difference, for example.

Since it is considered that the head-mounted display according to the second embodiment is worn by the user during exercise or the like, it is desirable that the number of operations required to change the display image be as small as possible.

Therefore, the image selection section 150 may select the initial display image from the plurality of display images stored in the display buffer 160 as the display image to be displayed on the display section 110 when it has been determined that the difference represented by the motion information is smaller than a given threshold value.

Note that whether or not the difference in direction is smaller than the given threshold value need not necessarily be determined within one display period and one non-display period. For example, the initial display image may be selected when it has been determined that the difference in direction is smaller than the given threshold value over a given number of (e.g., three) display periods and a given number of (e.g., three) non-display periods. The determination period may be set taking account of the time required for the user to read the contents of the display image, for example.

This makes it possible to display the initial display image on the display section without requiring the user to perform a special motion (operation), for example.

The following process may be performed when switching the display state. Specifically, the control section 120 may perform the control process that switches the display state of the display image by causing an illumination light source to emit light during the display period, and causing the illumination light source not to emit light during the non-display period.

In the second embodiment, an LED or the like is used as the illumination light source. When using an LED or the like as the illumination light source, it is normally necessary to drive the illumination light source using a current equal to or less than the rated current when always displaying the display image. However, it is possible to drive the illumination light source using a current more than the rated current when momentarily displaying the display image. Therefore, it is possible to momentarily display a bright image. This makes it possible to further improve visibility, and allow the user to clearly observe the display image even in a bright environment (e.g., outdoors), for example. Note that the above display control process may also be employed in the first embodiment and the third embodiment.

3.3. Flow of Process

Figure 6:
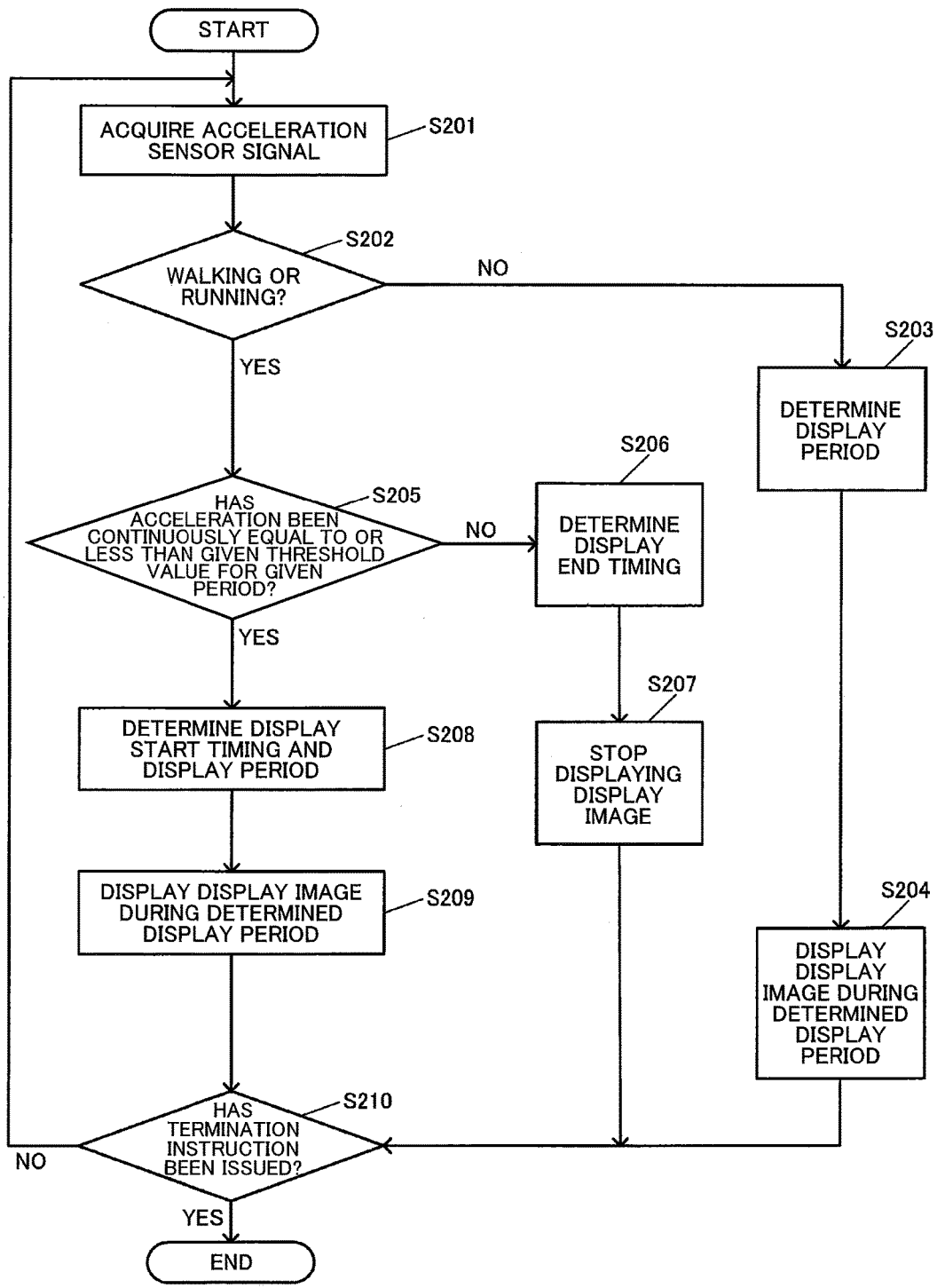
FIG. 6 is a flowchart illustrating the flow of a process according to the second embodiment.

The flow of the process according to the second embodiment is described below using the flowchart illustrated in FIG. 6.

The sensor signal acquisition section 130 acquires the acceleration sensor signal (S201). The sensor signal acquisition section 130 transmits the acquired acceleration sensor signal to the control section 120, and the control section 120 determines whether or not the user is walking or running based on the acquired acceleration sensor signal (S202).

When it has been determined that the user is not walking or running in the step S202, the display period of the display image is determined (S203), and the display image is displayed on the display section 110 during the determined display period (S204). Whether or not the display control process termination instruction has been issued is then determined (S210). When it has been determined that the termination instruction has been issued, the process is terminated. When it has been determined that the termination instruction has not been issued, the step S201 is performed again. The details of the termination instruction are the same as those described above in connection with the first embodiment. The above process is the same as the process described above in connection with the first embodiment.

When it has been determined that the user is walking or running in the step S202, the control section 120 determines whether or not the acceleration has been continuously equal to or less than a given threshold value for a given period (S205).

When it has been determined that the acceleration has been continuously larger than the given threshold value for the given period, the control section 120 determines the display end timing (S206). The display image displayed on the display section 110 is turned OFF at the determined display end timing (S207). Whether or not the termination instruction has been issued is then determined (S210). When it has been determined that the termination instruction has been issued, the process is terminated. When it has been determined that the termination instruction has not been issued, the step S201 is performed again.

When it has been determined that the acceleration has been continuously equal to or less than the given threshold value for the given period in the step S205, the control section 120 determines the display start timing and the display period based on the acquired acceleration sensor signal (S208). Note that the display start timing and the display period are determined as described above.

The display image is displayed on the display section 110 during the display period that starts from the determined display start timing (S209). Whether or not the termination instruction has been issued is then determined (S210). When it has been determined that the termination instruction has been issued, the process is terminated. When it has been determined that the termination instruction has not been issued, the step S201 is performed again.

4. Third Embodiment

4.1. System Configuration Example

In the third embodiment, the user 10 wears the head-mounted display 100 on his head (see FIG. 1A). In the third embodiment, the motion sensor 200 and the information terminal device 300 need not necessarily be used.

Figure 8:
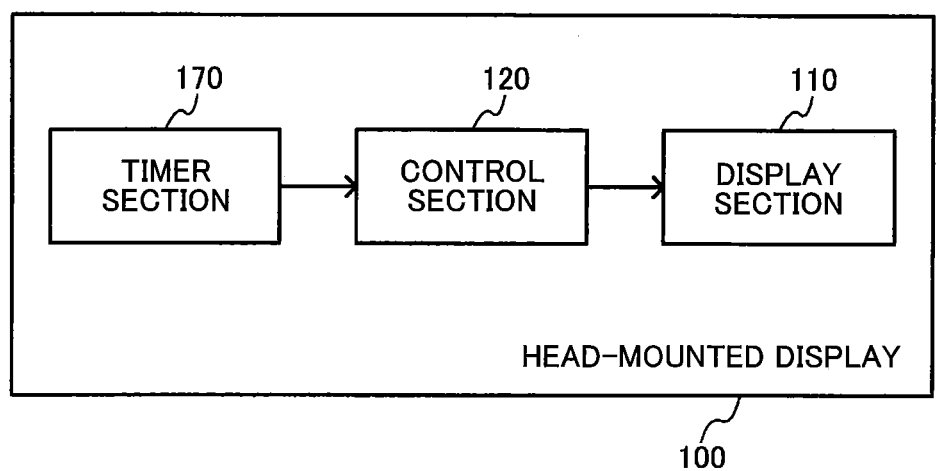
FIG. 8 illustrates a system configuration example according to a third embodiment.

FIG. 8 illustrates a configuration example of the head-mounted display 100 according to the third embodiment.

The head-mounted display 100 includes a display section 110, a control section 120, and a timer section 170. Note that the configuration of the head-mounted display 100 and an image display system that includes the head-mounted display 100 is not limited to the configuration illustrated in FIG.

8. Various modifications may be made, such as omitting some of the elements illustrated in FIG. 8, or adding other elements.

The connection relationship between each section is described below. The timer section 170 is connected to the control section 120, and the control section 120 is connected to the display section 110.

The process performed by each section is described below. The display section 110 and the control section 120 are configured in the same manner as described above in connection with the first embodiment, and description thereof is omitted.

The timer section 170 performs a count process that counts the display period or the non-display period. The function of the timer section 170 may be implemented by hardware such as a processor (e.g., CPU) or an ASIC (e.g., gate array), a program, or the like.

4.2. Method

The head-mounted display 100 according to the third embodiment may include the timer section 170 that performs the count process up to the expiration timing of the display period and the non-display period. The control section 120 may display the display image on the display section 110 when the timer section 170 has started the count process on the display period. The timer section 170 may start the count process up to the expiration timing of the non-display period when the count process up to the expiration timing of the display period has completed. The control section 120 may stop display of the display image when the timer section 170 has started the count process on the non-display period.

According to the third embodiment, the timer section 170 performs the count process on the display period and the non-display period. Therefore, the control section 120 need not determine whether or not the display period (non-display period) has expired after the display period and the non-display period, for example. Note that the control section 120 may perform part of the determination process, for example. The control section 120 may perform an interrupt process to stop the count process when the user has input an instruction that instructs to stop the count process, for example.

This makes it possible to simplify the process, and reduce the implementation cost, for example.

4.3. Flow of Process

Figure 9:
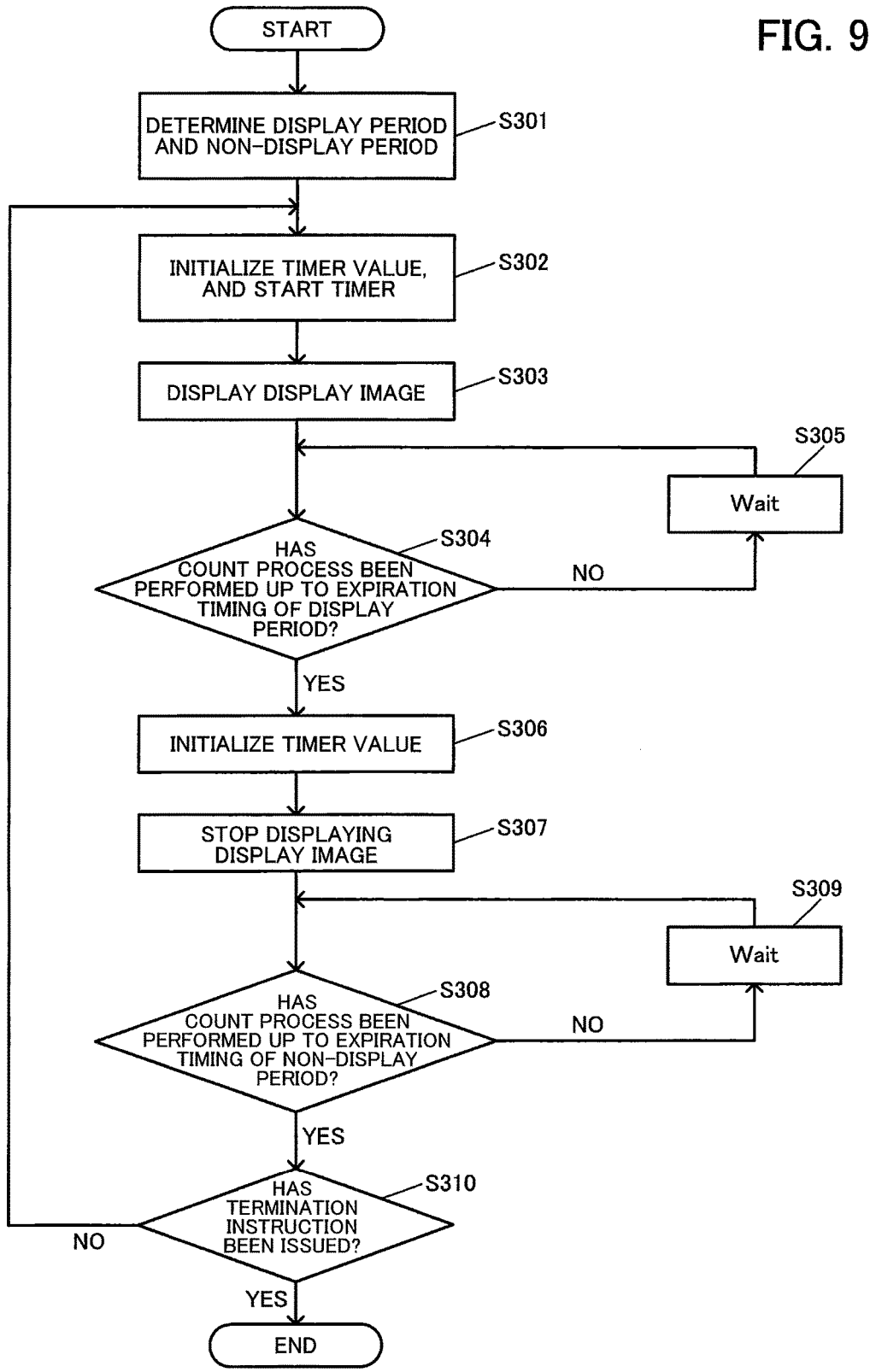
FIG. 9 is a flowchart illustrating the flow of a process according to the third embodiment.

The flow of the process according to the third embodiment is described below using the flowchart illustrated in FIG. 9.

The control section 120 determines the display period and the non-display period (S301).

The timer section 170 initializes the timer value to 0, starts the timer, and starts the count process up to the expiration timing of the display period (S302). The display section 110 then displays the display image (S303). Note that the initial timer value is not limited to 0, but may be set to an arbitrary value. In this case, it is necessary to perform the count process after adding the initial timer value to the expiration timing as an offset value in order to perform an accurate count process. This also applies to the non-display period count process.

The control section 120 determines whether or not the count process has been performed up to the expiration timing of the display period (S304).

When the control section 120 has determined that the count process has not been performed up to the expiration timing of the display period, the control section 120 stands by for a given period (S305), and performs the determination process in the step S304 again.

When the control section 120 has determined that the count process has been performed up to the expiration timing of the display period, the timer section 170 initializes the timer value to 0, and starts the count process up to the expiration timing of the non-display period (S306). The display section 110 stops display of the display image (S307).

The control section 120 then determines whether or not the count process has been performed up to the expiration timing of the non-display period (S308).

When the control section 120 has determined that the count process has not been performed up to the expiration timing of the non-display period, the control section 120 stands by for a given period (S309), and performs the determination process in the step S308 again.

When the control section 120 has determined that the count process has been performed up to the expiration timing of the non-display period, the control section 120 determines whether or not the termination instruction has been issued (S310). When the control section 120 has determined that the termination instruction has been issued, the process is terminated. When the control section 120 has determined that the termination instruction has not been issued, the step S302 is performed again. The details of the termination instruction are the same as those described above in connection with the first embodiment.

Note that part or the most of the process performed by the head-mounted display, the image display system, and the like according to the embodiments of the invention may be implemented by a program. In this case, the head-mounted display, the image display system, and the like according to the embodiments of the invention are implemented by causing a processor (e.g., CPU) to execute the program. Specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a head-mounted display and an image processing system (i.e., a device that includes an operation section, a processing section, a storage section, and an output section) to function as each section according to the embodiments of the invention (i.e., a program that causes a computer to execute the process implemented by each section) is stored in the information storage device.

The head-mounted display, the image display system, and the like according to the embodiments of the invention may include a processor and a memory. The processor may be a central processing unit (CPU), for example. Note that the processor is not limited to a CPU. Various types of processors such as a graphics processing unit (GPU) and a digital signal processor (DSP) may also be used. The processor may be a hardware circuit that includes an application specific integrated circuit (ASIC). The memory stores a computer-readable instruction. Each section of the head-mounted display, the image display system, and the like according to the embodiments of the invention is implemented by causing the processor to execute the instruction. The memory may be a semiconductor memory (e.g., static random access memory (SRAM) or dynamic random access memory (DRAM)), a register, a hard disk, or the like. The instruction may be an instruction included in an instruction set of a program, or may be an instruction that causes a hardware circuit of the processor to operate.

Although the first to third embodiments of the invention have been described in detail above, those skilled in the art will readily appreciate that many modifications are possible in the first to third embodiments without materially departing from the novel teachings and advantages of the invention. Accordingly, all such modifications are intended to be included within the scope of the invention. Any term cited with a different term having a broader meaning or the same meaning at least once in the specification and the drawings can be replaced by the different term in any place in the specification and the drawings. The configuration and the operation of the head-mounted display, the image display system, the information storage device, and the like are not limited to those described above in connection with the embodiments. Various modifications and variations may be made of the embodiments.

What is claimed is:

1. A head-mounted display that is worn on a head of a user, and allows the user to observe a display image, the head-mounted display comprising:
   a display that displays the display image; and
   a controller comprising hardware, the controller being configured to control a timing at which the display image is displayed on the display, the controller controlling the timing by;
      acquiring a motion sensor signal from a motion sensor configured to detect a motion of a head of the user, and
      causing a display period and a non-display period to repeat alternately on the display by determining a display start timing of the display image based on the acquired motion sensor signal, the display period being a period in which the display image is displayed on the display, and the non-display period being a period in which the display image is not displayed on the display.

2. The head-mounted display as defined in claim 1, wherein the controller:
   acquires an acceleration sensor signal as the motion sensor signal,
   detects peaks of an acceleration of the motion of the user based on the acceleration sensor signal acquired from the sensor signal acquisition section, and
      sets a given period that includes an intermediate timing to be the display period, the intermediate timing being a timing between a first peak and a second peak that have been detected.

3. The head-mounted display as defined in claim 1, wherein the controller:
   acquires an acceleration sensor signal as the motion sensor signal,
   detects an acceleration of the motion of the user based on the acceleration sensor signal acquired from the sensor signal acquisition section,
   determines whether or not the acceleration has been continuously equal to or less than a given threshold value for a given period,
   determines the display start timing of the display image, and displaying the display image on the display from the determined display start timing, when it has been determined that the acceleration has been continuously equal to or less than the given threshold value for the given period, and
   determines a display end timing of the display image, and causing the display image not to be displayed on the display at the determined display end timing, when it has been determined that the acceleration has been continuously larger than the given threshold value for the given period.

4. The head-mounted display as defined in claim 1, wherein the controller determines whether or not the user is in a stationary state based on the motion sensor signal, and continuously displays the display image on the display when it has been determined that the user is in the stationary state.

5. The head-mounted display as defined in claim 1, wherein the controller is further configured to:
   select an icon image from a plurality of icon images displayed on the display,
   acquire a first sensor signal and a second sensor signal, the first sensor signal being the motion sensor signal, and the second sensor signal being a sensor signal from a sensor provided to an information terminal device,
   display a selection menu screen in the display in which the plurality of icon images are displayed side by side, and
   cause an image among the plurality of icon images to be selected instead of a currently selected icon image among the plurality of icon images based on the first sensor signal and the second sensor signal.

6. The head-mounted display as defined in claim 1, further comprising:
   a memory that stores a plurality of the display images;
   wherein the controller is further configured to select the display image displayed on the display,
   select the display image from the plurality of display images stored in the memory based on the acquired motion sensor signal, and
   display the selected display image on the display.

7. The head-mounted display as defined in claim 6, wherein the controller is further configured to:
   acquire a display timing motion sensor signal that represents a motion of the user during the display period, and acquire a non-display timing motion sensor signal that represents a motion of the user during the non-display period, and
   select the display image to be displayed on the display from the plurality of display images stored in the memory based on the display timing motion sensor signal and the non-display timing motion sensor signal.

8. The head-mounted display as defined in claim 7, wherein the controller is further configured to:
   specify motion information that represents a difference between a direction in which the user faces during the display period and a direction in which the user faces during the non-display period, based on the display timing motion sensor signal and the non-display timing motion sensor signal, and
   select the display image to be displayed on the display from the plurality of display images stored in the memory based on the specified motion information.

9. The head-mounted display as defined in claim 8, wherein the controller is further configured to select an initial display image from the plurality of display images stored in the memory as the display image to be displayed on the display when it has been determined that the difference represented by the motion information is smaller than a given threshold value.

10. A method for controlling a head-mounted display that is worn on a head of a user, and allows the user to observe a display image, the method comprising:
  displaying the display image;
  acquiring a motion sensor signal from a motion sensor configured to detect a motion of a head of the user; and
  performing a control process that causes a display period and a non-display period to repeat alternately, and determines a display start timing of the display image based on the acquired motion sensor signal, the display period being a period in which the display image is displayed, and the non-display period being a period in which the display image is not displayed.

11. The head-mounted display according to claim 1, further comprising the motion sensor.

12. The head-mounted display according to claim 11, wherein the motion sensor is arranged on a portion of the head-mounted display.

13. The head-mounted display according to claim 1, wherein the motion sensor is configured to detect an acceleration profile of the motion of the head of the user corresponding to one or more strides taken by the user, and the display start timing of the display image is based on a predetermined portion of the acceleration profile detected by the motion sensor, wherein the predetermined portion is less than the acceleration profile for a single stride.

14. The head-mounted display according to claim 13, wherein the predetermined portion of the acceleration profile is a portion having less than maximum acceleration.

15. A head-mounted display that is worn on a head of a user, and allows the user to observe a display image, the head-mounted display comprising:
  a display that displays the display image; and
  a controller comprising hardware, the controller being configured to control a timing at which the display image is displayed on the display, the controller controlling the timing by;
  acquiring a motion sensor signal from a motion sensor configured to detect a motion of the user, and
  causing a display period and a non-display period to repeat alternately on the display by detecting blurring of the display image based on the motion sensor signal, and determining a display start timing of the display image based on the blurring, the display period being a period in which the display image is displayed on the display, and the non-display period being a period in which the display image is not displayed on the display.

16. A head-mounted display that is worn on a head of a user, and allows the user to observe a display image, the head-mounted display comprising:
  a display that displays the display image;
  a controller comprising hardware, the controller being configured to control a timing at which the display image is displayed on the display, the controller controlling the timing by;
  acquiring a motion sensor signal from a motion sensor configured to detect a motion of the user, and
  causing a display period and a non-display period to repeat alternately on the display by detecting an acceleration including a vertical direction of the head-mounted display based on the motion sensor signal, and determining a display start timing of the display image based on the acceleration including the vertical direction, the display period being a period in which the display image is displayed on the display, and the non-display period being a period in which the display image is not displayed on the display.

* * * * *